(12) United States Patent
Kepler et al.

(10) Patent No.: US 7,103,589 B1
(45) Date of Patent: Sep. 5, 2006

(54) METHOD AND SYSTEM FOR SEARCHING, ACCESSING AND UPDATING DATABASES

(75) Inventors: Michael A. Kepler, Aloha, OR (US); Christopher A. Huey, Banks, OR (US); Runping Qi, Cupertino, CA (US); Christopher A. Wake, Rochester, NY (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

(21) Appl. No.: 09/532,402

(22) Filed: Mar. 22, 2000

Related U.S. Application Data

(63) Continuation-in-part of application No. 09/289,457, filed on Apr. 9, 1999, now Pat. No. 6,745,177.

(51) Int. Cl.
G06F 7/00 (2006.01)
G06F 13/14 (2006.01)

(52) U.S. Cl. ................ 707/3; 707/6; 707/7; 379/93.17; 379/207.15

(58) Field of Classification Search .................... 707/1, 707/3–6, 10, 201, 7; 379/93.17, 207.15
See application file for complete search history.

(56) References Cited

U.S. PATENT DOCUMENTS

| | | | |
|---|---|---|---|
| 4,648,036 A * | 3/1987 | Gallant ........................ 707/203 |
| 4,774,655 A | 9/1988 | Kollin et al. |
| 4,845,658 A | 7/1989 | Gifford |
| 5,369,763 A * | 11/1994 | Biles ............................ 707/3 |
| 5,404,295 A | 4/1995 | Katz et al. |
| 5,454,105 A | 9/1995 | Hatakeyama et al. |
| 5,511,186 A | 4/1996 | Carhart et al. |
| 5,548,770 A | 8/1996 | Bridges |
| 5,560,005 A * | 9/1996 | Hoover et al. ................ 707/10 |
| 5,600,831 A | 2/1997 | Levy et al. |
| 5,675,785 A | 10/1997 | Hall et al. |
| 5,717,748 A | 2/1998 | Sneed, Jr. et al. |
| 5,724,575 A * | 3/1998 | Hoover et al. ................ 707/10 |
| 5,761,663 A | 6/1998 | Lagarde et al. |
| 5,764,741 A * | 6/1998 | Barak ......................... 379/114 |
| 5,826,261 A * | 10/1998 | Spencer ....................... 707/10 |
| 5,832,481 A * | 11/1998 | Sheffield ........................ 707/4 |

(Continued)

FOREIGN PATENT DOCUMENTS

WO    WO 99/16258    4/1999

OTHER PUBLICATIONS

Dialindex Database Catalog, 1992, pp. 5-7.

(Continued)

Primary Examiner—Jean M. Corrielus
Assistant Examiner—Anh Ly
(74) Attorney, Agent, or Firm—Kaye Scholer LLP

(57) ABSTRACT

A system and method for searching, accessing updating database records on a plurality of geographically dispersed databases is provided. Update databases consisting of a plurality of update records having at least one field capable of being set to at least one particular value are used to update records in target databases. When a database search is conducted on one or more target databases, a search is also conducted on update databases associated with the target databases. The results of the searches are processed. If the at least one field in an update record is set to a predefined value, then all returned records equivalent to the update record are discarded. Otherwise, the update record is added to the search result.

27 Claims, 13 Drawing Sheets

U.S. PATENT DOCUMENTS

| | | | |
|---|---|---|---|
| 5,859,972 | A | 1/1999 | Subramaniam et al. |
| 5,884,304 | A | 3/1999 | Davis, III et al. |
| 5,903,636 | A | 5/1999 | Malik |
| 5,913,160 | A * | 6/1999 | Leung .................. 455/403 |
| 5,966,712 | A | 10/1999 | Sabatini et al. |
| 5,987,454 | A * | 11/1999 | Hobbs ..................... 707/4 |
| 6,018,733 | A | 1/2000 | Kirsch et al. |
| 6,023,696 | A | 2/2000 | Osborn et al. |
| 6,052,718 | A * | 4/2000 | Gifford .................. 709/219 |
| 6,088,444 | A * | 7/2000 | Walker et al. ......... 379/266.02 |
| 6,097,801 | A * | 8/2000 | Williams et al. ....... 379/221.13 |
| 6,144,958 | A * | 11/2000 | Ortega et al. ................. 707/5 |
| 6,163,597 | A * | 12/2000 | Voit ..................... 379/93.17 |
| 6,243,715 | B1 * | 6/2001 | Bogantz et al. ............. 707/201 |
| 6,253,208 | B1 * | 6/2001 | Wittgreffe et al. ............ 707/10 |
| 6,275,832 | B1 * | 8/2001 | Watts et al. ............... 707/203 |
| 6,289,094 | B1 * | 9/2001 | Miloslavsky ........... 379/220.01 |
| 6,289,335 | B1 * | 9/2001 | Downing et al. ............. 707/3 |
| 6,289,339 | B1 | 9/2001 | Weber |
| 6,330,555 | B1 | 12/2001 | Weber |
| 6,336,116 | B1 * | 1/2002 | Brown et al. ................ 707/10 |
| 6,363,377 | B1 * | 3/2002 | Kravets et al. ............... 707/4 |
| 6,374,241 | B1 * | 4/2002 | Lamburt et al. .............. 707/6 |
| 6,745,177 | B1 * | 6/2004 | Kepler et al. ................. 707/3 |
| 2001/0021935 | A1 * | 9/2001 | Mills ......................... 707/10 |
| 2001/0049685 | A1 * | 12/2001 | Carey et al. .................. 707/10 |

OTHER PUBLICATIONS

Database Catalog, "DIALOG", pp. 5-7 (1992).

"An Architecture for Large Scale Information Systems", by David K. Gifford et al., MIT Laboratory for Computer Science, pp. 161-170 (1985) ACM-0-89791-174-1-12/85-0161.

"Discover: a resource discovery system based on content routing", by Mark A. Sheldon et al., Computer Networks and ISDN Systems 27, pp. 953-972 (1995).

"An Adaptive Approach to Query Mediation Across Heterogeneous Information Sources", by Ling Liu et al., Dept. of Computing Science/University of Alberta and Dept. of Computer Science and Engineering/Oregon Graduate Institute, pp. 144-156 (1996) 0-8186-7505-5/96 IEEE.

"Query Routing: Applying Systems Thinking to Internet Search", by Paul J. Leach et al., pp. 82-86 (1997) Microsoft Corporation, 0-8186-7834-8/97 IEEE.

"MAGIC: A Multiattribute Declustering Mechanism for Multiprocessor Database Machines", by Shahram Ghandeharizadeh et al., pp. 509-524, IEEE Transactions on Parallel and Distributed Systems, vol. 5, No. 5, May 1994.

* cited by examiner

| 28 | ME/VT Database | | | | | |
|---|---|---|---|---|---|---|
| | Last Name | First Name | City | State | Telephone Number | Zip Code |
| 34 | Smith | Jon | Portland | ME | (207) 555-1212 | 04103 |
| | Smith | Jon | Portland | ME | (207) 555-1212 | 04103 |

54 spans Last Name and First Name headers.

| 30 | OR/WA Database | | | | | |
|---|---|---|---|---|---|---|
| | Last Name | First Name | City | State | Telephone Number | Zip Code |
| | Doe | Jane | Portland | OR | (503) 555-1111 | | ← 67
| 34 | Doe | John | Portland | OR | (503) 555-1212 | | ← 66
| | Smith | Jon | Portland | OR | (503) 555-1234 | 97223 | ← 68

| 32 | CA/NV Database | | | | | |
|---|---|---|---|---|---|---|
| | Last Name | First Name | City | State | Telephone Number | Zip Code |
| | Jones | Sue | San Francisco | CA | (415) 555-1212 | |
| 34 | Lee | Al | San Francisco | CA | (415) 555-1111 | |
| | Smith | Jon | Las Vegas | NV | | |

| 24 | Search Routing Database | | |
|---|---|---|---|
| | City | State | Database Identifier |
| | Portland | ME | ME/VT | ← 27
| | Seattle | WA | OR/WA |
| 26 | Portland | OR | OR/WA | ← 25
| | San Francisco | CA | CA/NV |
| | Las Vegas | NV | CA/NV |

New York Office

| City | State | Database Server |
|---|---|---|
| New York | NY | Larry |
| New York | NY | Curly |
| Los Angeles | CA | Hank |
| San Francisco | CA | Oscar |

252

Los Angeles Office

| City | State | Database Server |
|---|---|---|
| Los Angeles | CA | Kato |
| New York | NY | Stooges |
| San Francisco | CA | Oscar |

253

San Francisco Office

| City | State | Database Server |
|---|---|---|
| New York | NY | Stooges ◄——— 260 |
| Los Angeles | CA | Hank |

FIG. 9

METHOD AND SYSTEM FOR SEARCHING, ACCESSING AND UPDATING DATABASES

CROSS REFERENCES TO RELATED APPLICATIONS

This application is a continuation in part of U.S. patent application Ser. No. 09/289,457 filed Apr. 9, 1999 now U.S. Pat. No. 6,745,177.

BACKGROUND OF THE INVENTION

1. Field of Invention

The present invention relates generally to information retrieval from multiple information sources. More particularly, the present invention relates to a method and system for searching, accessing and updating information in a large network of databases quickly and efficiently. The present invention also applies to non-networked environments.

2. Discussion of the Related Art

In the field of information management, it is often desirable to store data in a network of multiple databases, each database containing a subset of the data contained in the network. To make effective use of the information stored in such a network, it is important to be able to access the information quickly and efficiently. However, when a network contains multiple databases, locating a desired piece of data can be difficult since it requires detailed knowledge of the characteristics of each of the databases in the network in order to determine which databases contain the desired data.

One approach to lessening this difficulty has been to provide the user with a summarized description of the contents of each of the distributed databases, thus enabling the user to search those databases which, based on the description, seem most likely to contain responsive information. However, such an approach suffers from the problem that the abstracted descriptions of the databases will, by necessity, be somewhat imprecise, thereby creating the possibility that the user will not be able to locate the desired information. In addition, when there are a large number of distributed databases, even a set of descriptions of the contents of each database can be too much information for a user to process quickly and effectively. Finally, use of database descriptors presumes some level of intelligence on the part of the user, who is asked to select the descriptor or descriptors of the databases that are most likely to contain the desired data. As a result, when the "user" is a computer, such a system necessitates the use of knowledge-based algorithms, which can be complicated, costly, and prone to errors.

One way to reduce these problems would be to simply decrease the number of databases in the network, thereby decreasing the number of database descriptions and enabling each description, in turn, to be more complete. However, this approach can increase the cost of maintaining the database network, since it reduces the database administrator's flexibility to house data at the most logical location from an information-storage perspective, and can result in an inefficient use of system resources. For example, such an approach incurs the costs of transporting data to the designated storage sites, and also results in the simultaneous underutilization and overutilization of system resources as certain remote storage capabilities are not used while other storage facilities are called upon to store excessive quantities of data, necessitating the purchase of additional, or more costly, storage equipment at these sites. As a result, such an approach requires a complicated trade-off to be made between the ease of using, and the cost of administering, the database network.

Ideally, multiple databases at different locations could be utilized without increasing the complexity of using the system to the end-user, or significantly increasing the cost of operating the system to the system administrator. The physical separation of databases within the network would be transparent to the end user, enabling the user to view the entire network of distributed databases as a single database.

One approach to making the internal network architecture transparent to the user is to simply send each request for data to each of the databases in the network, thus ensuring that the user's search request will be performed on each of the databases in which responsive information, if any, is contained. There are two general ways to access each of the databases in the network: serially or in parallel. The advantage of accessing the databases serially is that only one database in the network needs to respond to the query at a time, thereby minimizing the amount of network resources being used at any given moment. However, serial access of each database in the network has serious disadvantages, foremost of which is that it can be a relatively time-consuming process, since each of the numerous databases will have to be accessed, one-at-a-time, to insure that all information responsive to the user's query is located.

Some of the disadvantages associated with serial access of separate databases can be avoided by accessing the databases in parallel. Under this approach, the same query is sent simultaneously to all of the databases in the network, thus avoiding the need to successively poll each different database, and, as a result, decreasing the time required to obtain a response to an information request. But parallel access has disadvantages of its own. For example, each query still requires each of the databases in the network to be accessed, thereby consuming resources at all of the databases, and incurring costs in time and money depending on how distant, or how busy, the databases are. Moreover, truly parallel access of a large number of databases can require a prohibitive amount of network bandwidth and processing power, thereby further increasing the cost and complexity of the system.

Large information systems are frequently characterized by a plurality of large individual databases. The size of these databases makes the tasks of keeping them current a difficult one. This difficulty is exacerbated by the fact that often these individual databases are not centrally located but are instead dispersed across a large geographic region. Updating such large information systems presents unique problems. One approach employed to update such large information systems is to simply rebuild each of the databases with updated information. However, rebuilding a large information system presents a number of difficulties. The process of rebuilding a database frequently requires that the target database be taken off-line. When off-line, the database is inaccessible as a source of information in the information system. Moreover, when there are only a few records in the entire database to be updated, a rebuild of an entire database is a wasteful use of resources.

In addition to these logistical problems associated with rebuilding databases, problems arise because certain databases are either static, incapable of being updated or read-only because of security concerns. Thus, a database rebuild of these databases is simply not an option. Updating databases for which a user is provided read-only access or which are static or incapable of being updated thus provides a unique set of problems.

SUMMARY OF INVENTION

Accordingly, it is desirable to provide a method and system for accessing data in a network of databases quickly and efficiently, and in a manner that renders the internal architecture of the network of databases transparent to the user. The data is preferably accessed without relying on abstractions of the contents of the databases, instead relying on literal content. This method and system for accessing data in a network of databases desirably provides broad flexibility in data management and distribution across the network.

These and other advantages are achieved by the present invention, which in one exemplary embodiment provides a data retrieval system that includes a plurality of databases, each database including one or more records comprised of a plurality of fields. A search-routing database is also provided that includes one or more records comprised of a plurality of fields, one of which contains a database identifier. In addition, the system includes a proxy server for receiving a first search request and forming a modified search request, wherein the modified search request includes a subset of the fields of data contained in the first search request. The system further includes a search engine for searching the search-routing database using the modified search request and returning one or more database identifiers; a router for sending the first search request to the identified database(s); another search engine for searching the identified database(s) for data responsive to the first search request; and an output device for returning responsive data to a user.

In yet another exemplary embodiment of the invention, a method of retrieving data from a plurality of databases is provided. In this embodiment of the invention, a proxy server first receives an input search request having a plurality of fields from a user. Next, the proxy server creates a modified search request by extracting certain fields from the original search request. A search-routing database is then searched for data responsive to the modified search request. If responsive data is found in the search-routing database, then one or more database identifiers associated with the responsive data is returned to the proxy server. Next, the original search request is routed to the database(s) identified by the one or more database identifiers. The database(s) are searched for data responsive to the original search request. If responsive data is located, it is returned to the proxy server and ultimately to the user.

As described above, there is also a need to provide a method and system for updating information in a large network of databases quickly and efficiently, and in a manner that does not disrupt the normal operation of the system. In addition, there is a need for a method and system for updating information in a large network of databases where the database user has no ability or access to rebuild the database.

These and other advantages are achieved by the present invention that, in addition to the retrieval system described above, includes one or more update databases. These update databases are associated with one or more of the other databases in the system. An update database has a structure similar to the database to which it is associated, having one or more records comprised of a plurality of fields. A database manager may set the values of the fields of a record in an update database to match or come close to those of a record in an associated database. Thus, a record in the update database can be substantially equivalent to a record in the associated database by any number of matching rules established by the database manager. An additional field included in each of the records of an update database facilitates on-the-fly updating. This extra field, sometimes referred to as the UPDATE_ACTION field, typically will contain a value. If the particular value indicates that the record represents a "DELETE" request, all records in the associated databases that are equivalent to the record in the update database will be ignored (or omitted from output) if performing on-the-fly updating and deleted if performing a database rebuild.

A method for on-the-fly updating of information in a large network of databases thus becomes a matter of determining which records in one or more database search result sets or streams are to be included in a particular result set returned to the user. This is accomplished by comparing the records in the one or more database search result sets or streams. If one or more records in the one or more result sets or streams contain the particular value indicating a delete request in the particular field designated as the UPDATE_ACTION field, then all records considered logically equivalent by whatever matching rules have been established to said record containing the delete indicator will be omitted from the result set or stream returned to the user, in the case of on-the-fly updating, or omitted from inclusion in a database under construction in the case of a database rebuild.

BRIEF DESCRIPTION OF THE DRAWINGS

The features and advantages of the present invention will be better understood by reference to the following detailed description, which should be read in conjunction with the accompanying drawings in which:

FIG. 4 is an illustration of the relationship between the data stored in a search-routing database and other databases in the system.

FIG. 9 illustrates a plurality of search routing tables according to the illustrative embodiment of the invention shown in FIG. 8.

DETAILED DESCRIPTION OF THE INVENTION

The following embodiments of the present invention will be described in the context of a network of databases used to provide directory assistance, although those skilled in the art will recognize that the disclosed systems and methods are readily adaptable for broader application.

Figure 1:
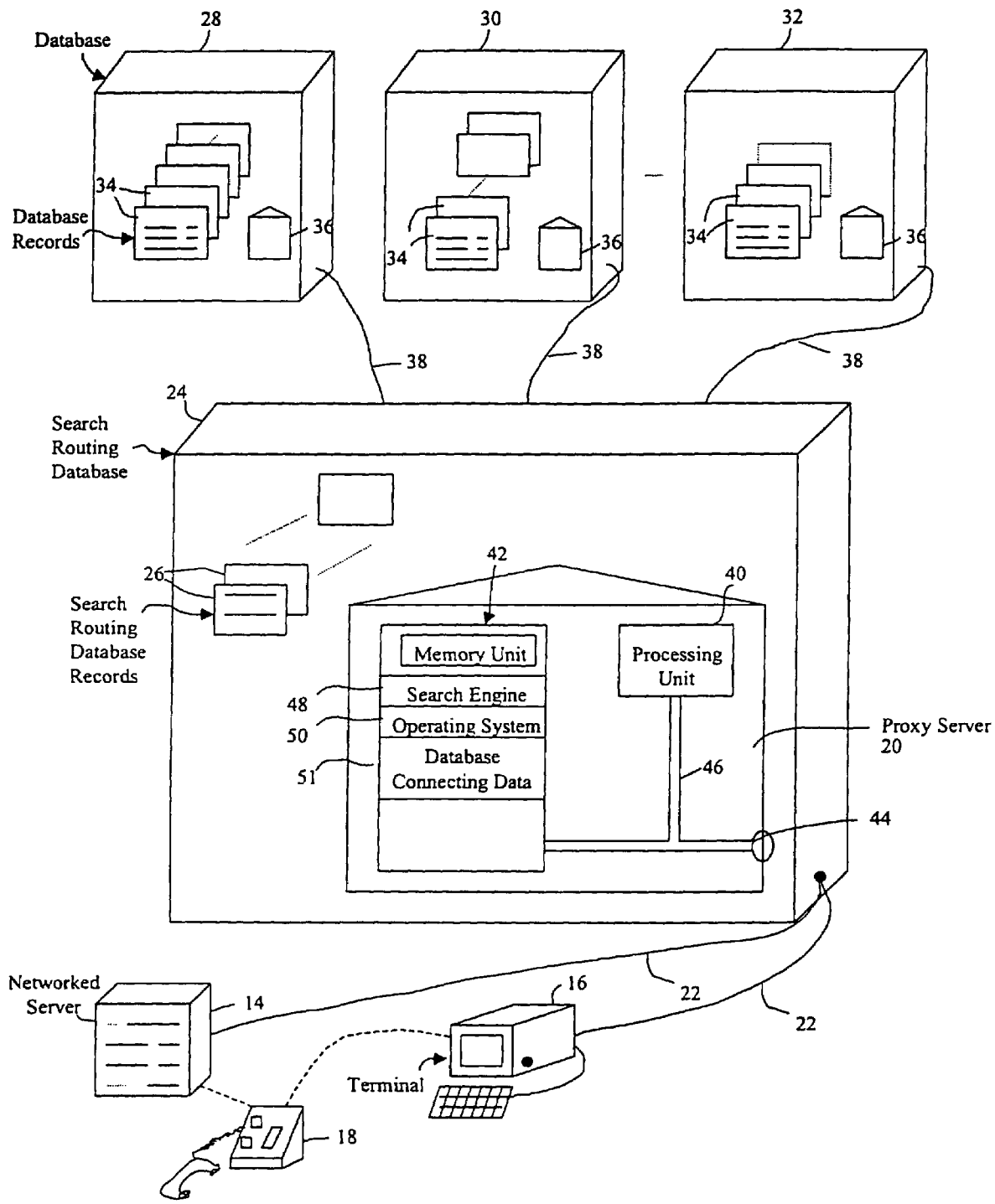
FIG. 1 is an illustration of a system for practicing the present invention.

FIG. 1 discloses a network of databases according to one illustrative embodiment of the invention. As shown in FIG. 1, the system includes one or more input devices, for example, a networked server 14 and a computer terminal 16. The networked server and/or computer terminal may be associated with a telephone 18, whether through an intermediary operator (not shown) or by direct connection. The telephone may be a landline, wireless, or cellular telephone. The input devices are capable of communicating with a proxy server 20 via data connections 22. The proxy server 20 is, in turn, connected to (or included within) a search-routing database 24 through input/output port 44, and connected to a group of databases 28, 30, 32 through network connections 38.

It will be appreciated that the present invention could be practiced using many different network configurations. For example, the databases 28, 30, 32 could comprise a local area network (LAN), a wide area network (WAN), or a group of conceptually separate databases within the memory of one or more computers. In addition, data connections 22 and network connections 38 may comprise any suitable combination of connectors, examples of which may include, without limitation, telephone lines, T1 lines, cable lines, communications buses, and satellite transmissions.

The proxy server 20 is understood to be a software entity or process which provides service to other software entities or, said another way, serves data to other software entities. The proxy server is an application that runs on an operating system that runs on hardware. Alternatively, a search router may be substituted in the present invention to perform the functions of proxy server 20.

In practice, one could dedicate a host exclusively to running a proxy server. In this situation, the host could be referred to as the proxy server and would typically include a processing unit 40, a memory unit 42, input/output port 44, and one or more communications buses 46 for interconnecting these components. The memory unit 42 may include both high speed random access memory (RAM) as well as non-volatile storage, such as magnetic disk and read only memory (ROM) devices. The memory unit 42 stores one or more database search engines 48 for performing database searches. For purposes of practicing the present invention, any suitable search engine can be selected. One example of such a search engine is the db-One full text search engine produced by Metro One Telecommunications. In an alternative embodiment, a keyword search engine could be utilized.

The memory unit 42 also includes database connecting data 51, to facilitate connection to databases 28, 30, 32, as well as an operating system 50, for performing basic system operations such as handling input and output, and for moving programs and data within the memory unit. In addition, in a further embodiment, search-routing database 24 is included in memory unit 42 of proxy server 20, thereby eliminating the need for a separate storage unit to contain the search-routing database.

Search-routing database 24 and databases 28, 30, 32 each store data in a plurality of records 26 and 34, respectively. In addition, databases 28, 30, 32 may each include, or be connected to, a server 36. Similar to proxy server 20, server 36 is a software entity which serves data to other software entities. Alternatively, server 36 may contain a memory unit, a processing unit and a communications port, the memory unit storing an operating system and a search engine. Although any suitable server may comprise servers 24 and 36, one suitable server is a Sun Microsystems EnterpriseServer 3500. Moreover, although databases 24, 28, 30, 32 may comprise any suitable data storage medium, one such storage medium is a Sun Microsystems Storage Array 100.

Figure 2:
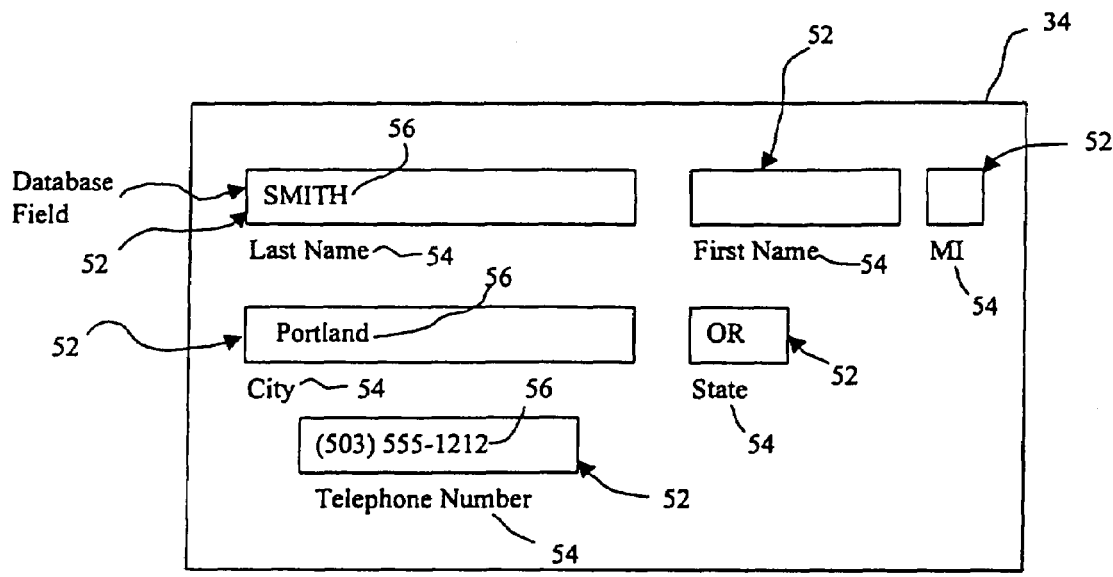
FIG. 2 is an illustration of a database record according to an embodiment of the present invention.
Figure 3:
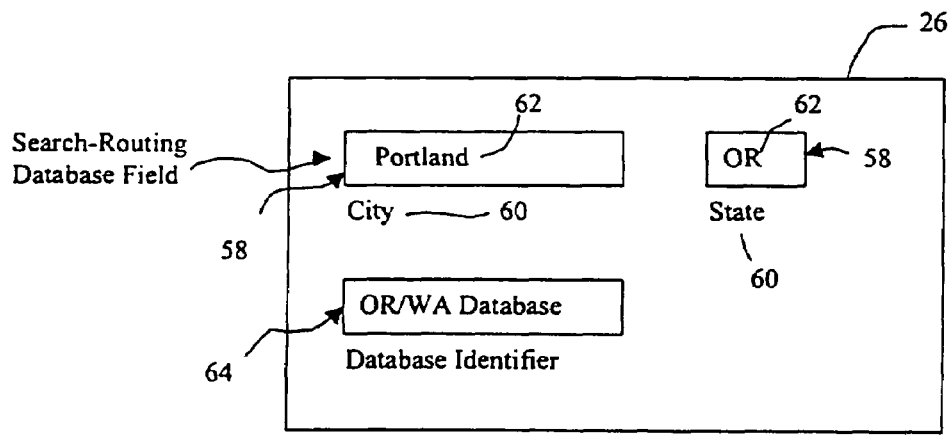
FIG. 3 is an illustration of a record in a search-routing database according to an embodiment of the present invention.

FIGS. 2 and 3 provide illustrations of the data records stored in databases 28, 30, 32 and the search-routing database 24, respectively, in one embodiment of the present invention. In particular, FIG. 2 shows an exemplary database record 34 having a plurality of fields 52, each field 52 having an associated field identifier 54 and potentially containing data 56. The database record 34 shown in FIG. 2, for example, has six fields 52 for storing data 56 regarding an individual's last name, first name, middle initial, city, state, and telephone number.

FIG. 3 shows an exemplary search-routing database record 26. Similar to database record 34, the search-routing database record 26 is comprised of fields 58, each field having an associated field-identifier 60 and potentially containing data 62. As discussed in more detail below, these fields 58 preferably correspond to one or more fields contained in the database records 34 contained in databases 28, 30, 32. Thus, in FIG. 3, the search-routing database record 26 includes city and state fields corresponding to the city and state fields contained in database records 34. The fields 58 utilized in the search-routing database records 26 are chosen to maximize the efficiency and comprehensiveness of a search, ensuring that only the minimum number of databases necessary to conduct a thorough search are searched. In addition, the search-routing database records 26 contain a database-identifier field 64 that stores the name of, pointer to, or any other suitable identifier of, one or more of the databases 28, 30, 32 containing the data found in fields 58.

It will be appreciated that all of the fields of a record need not be populated with data. For example, in FIG. 2, the first name field does not contain data. Moreover, the number of fields 52 and the specific field identifiers 54 shown in FIG. 2 and throughout this application have been chosen for purposes of illustration, and are not intended to limit the scope of the present invention. Persons of ordinary skill in the art may select fields and field identifiers according to their own needs based on the teachings of the present invention. In addition, the depiction of data, fields, and records in FIGS. 1, 2, and 3 and throughout this application is intended to facilitate an understanding of the principles of the present invention, and is not intended to limit the invention. For example, the notation "field" and "record" is not intended to refer exclusively to the data structures shown in FIG. 2, but may, instead, refer to any suitable combination of data structures that provides a mechanism for associating data with a suitable identifier or category in accordance with the principles of the present invention. Thus, it will be appreciated that, for example, each record contained in a database may not actually contain its own set of field identifiers, but may instead be stored in a table, such as that shown in FIG. 4, thus enabling the use of one set of field identifiers for all of the records in the table.

The relationship between the data stored in the search-routing database 24 and the data stored in databases 28, 30, 32 will now be discussed with reference to FIG. 4, which shows an example of the records contained in databases 28, 30, 32 and search-routing database 24. As shown in FIG. 4, databases 28, 30, 32 are illustratively shown as Maine/Vermont (ME/VT), Oregon/Washington (OR/WE), and California/Nevada (CA/NV) databases, respectively. The records 34 contained in databases 28, 30, 32 each have last name, first name, city, state, zip code and telephone number fields, some or all of which are populated with data. The records 26 contained in search-routing database 24, on the other hand, each have city, state, and database identifier fields, some or all of which are populated with data.

The data contained in the fields of the search-routing database 24 are preferably the same, or substantially the same, data contained in the corresponding fields of the records contained in databases 28, 30, 32, rather than an edited or abstracted version of this data. Whereas an abstracted version of the data could produce inaccurate search results and would take time and resources to create, use of the actual data provides a powerful way of ensuring that a search request will locate responsive data if the responsive data is contained in the network of databases. Additionally, use of the actual data is straightforward to implement.

Thus, in the example shown in FIG. 4, the search-routing database contains the actual city and state data contained in databases 28, 30, 32. In a preferred embodiment, however, the search-routing database contains only one record for each unique combination of fields. For example, the search-routing database shown in FIG. 4 preferably contains only one record in which the value for the city field is "Portland", the value for the state field is "OR", and the value for the database identifier field "OR/WA", even though, as shown in FIG. 4, the OR/WA database 30 contains three records 66, 67, 68 with those city and state values. It can be seen that if suitable fields are selected, the number of records stored in the search-routing database will be significantly smaller than number of records contained in databases 28, 30, 32, and the volume of data contained in the search-routing database records can be expected to be less voluminous than the data contained in databases 28, 30, 32 as well. It will be appreciated, however, that the selection of a desirable set of fields for the search-routing database will depend on the particular application for which the present invention is to be used, and that persons of ordinary skill in the art can readily select fields according to their own needs based on the teachings of the present invention.

The operation of the system described above will now be discussed with reference to FIG. 5, which provides a flow chart setting forth a method in accordance with the present invention for searching a group of databases 28, 30, 32 for data responsive to a search request, or query.

Figure 5:
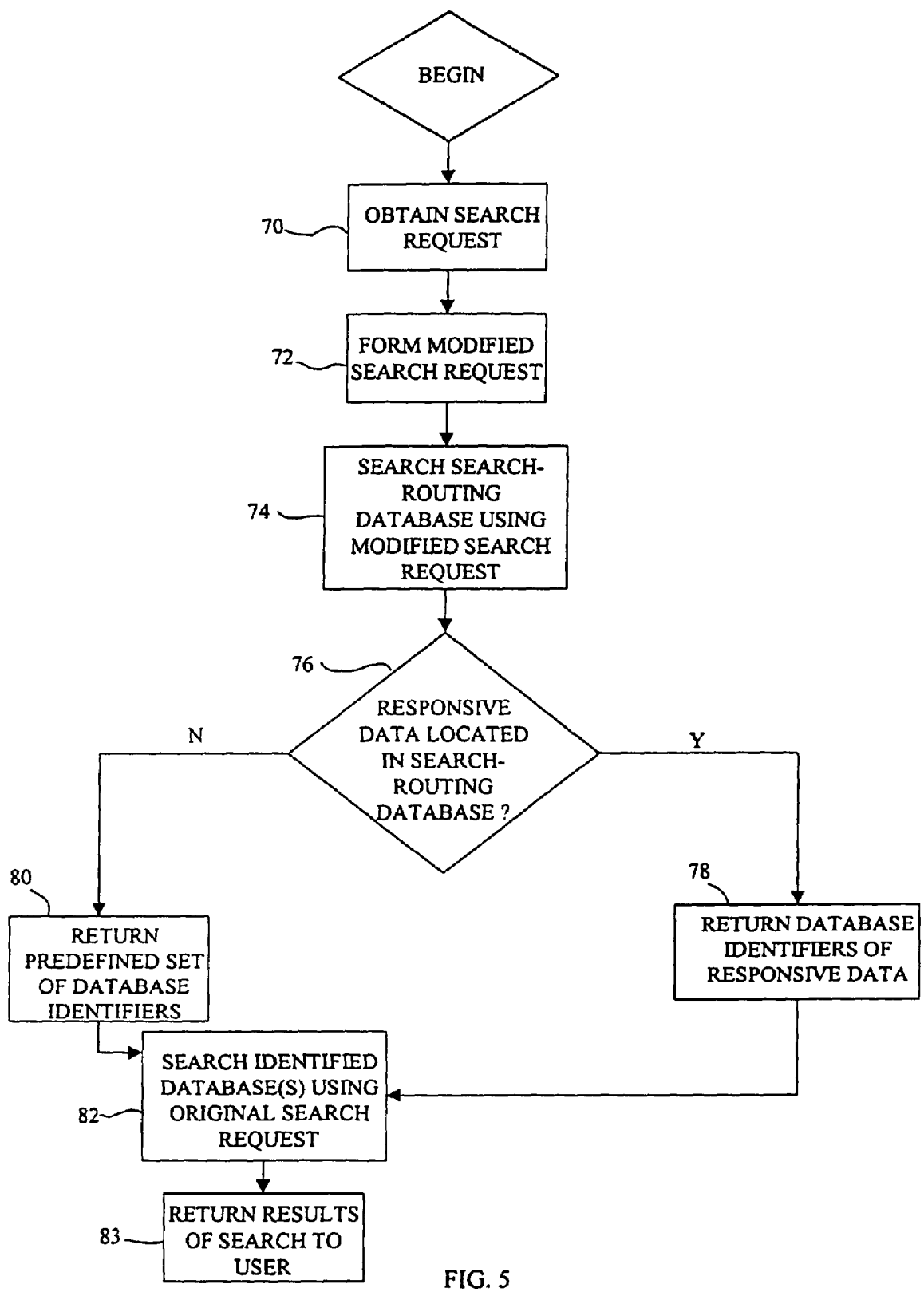
FIG. 5 is a flow chart setting forth an exemplary method of performing a search according to the present invention.

As shown in FIG. 5, a search request must first be obtained by the proxy server 20 (step 70). Several devices for generating such a request are shown in FIG. 1, namely terminal 16 and networked server 14, although it will be readily apparent to one of ordinary skill in the art that any of a number of other suitable devices could be used to generate the search request, such as telephone 18 in association with the terminal or networked server. Preferably, the user will be prompted by a user interface to enter the search request into the input device. In one embodiment, the user would be prompted to enter data into one or more fields corresponding to the fields 52 contained in a database record 34. However, it will be understood that the present invention could be practiced even if a search request were to contain some fields that were not included in a database record 34. It will also be appreciated that the invention could be practiced using a system that did not prompt the user to enter data into separate fields, but instead simply prompted the user for input, and then parsed the input into fields after it was received from the user. Alternatively, as discussed in more detail below, in some embodiments the user may be prompted to enter a portion of the input query, while other portions of the input query are automatically generated. Moreover, some input devices, such as networked server 14 may generate the search request automatically based on input received from another source or generated by an internal condition, and thus would not prompt a user for input.

Figure 6A:
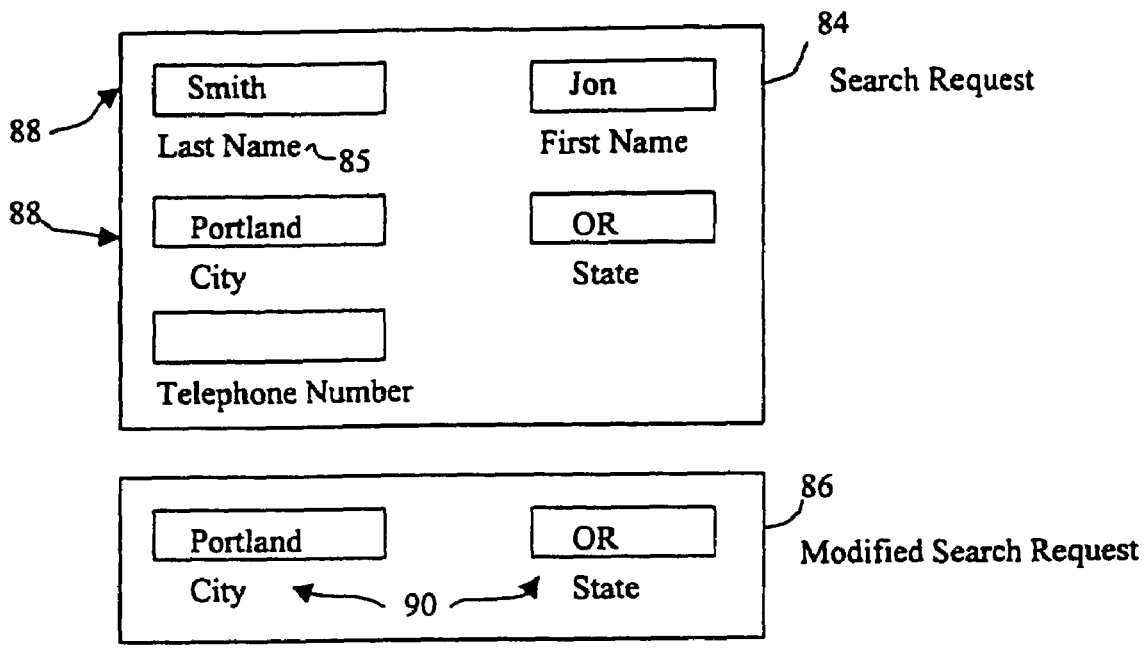
FIGS. 6A and 6B illustrate the relationship between a search request and a modified search request in different embodiments of the present invention.
Figure 6B:
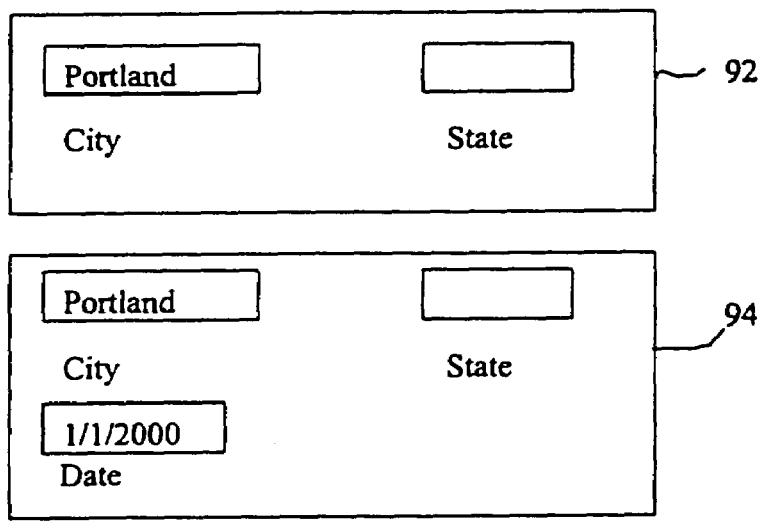

Once the search request has been entered and sent to the proxy server 20 a modified search request is formed (step 72). The proxy server 20 forms the modified search request by extracting the fields of data in the original search request that correspond to the fields of data contained in the search-routing database. FIG. 6A illustrates the relationship between an original search request 84 and a modified search request 86, according to one embodiment of the present invention. As seen in FIG. 6A, the input search request consists of a plurality of fields 88, some of which are populated with data. The modified search request 86 includes one or more fields 90 of data, corresponding to the fields 58 contained in a search-routing database record 26. The data stored in the fields 90 of the modified search request 86 is taken, or generated, from the original search request 84. Additional examples of modified search requests are shown in FIG. 6B.

Figure 7:
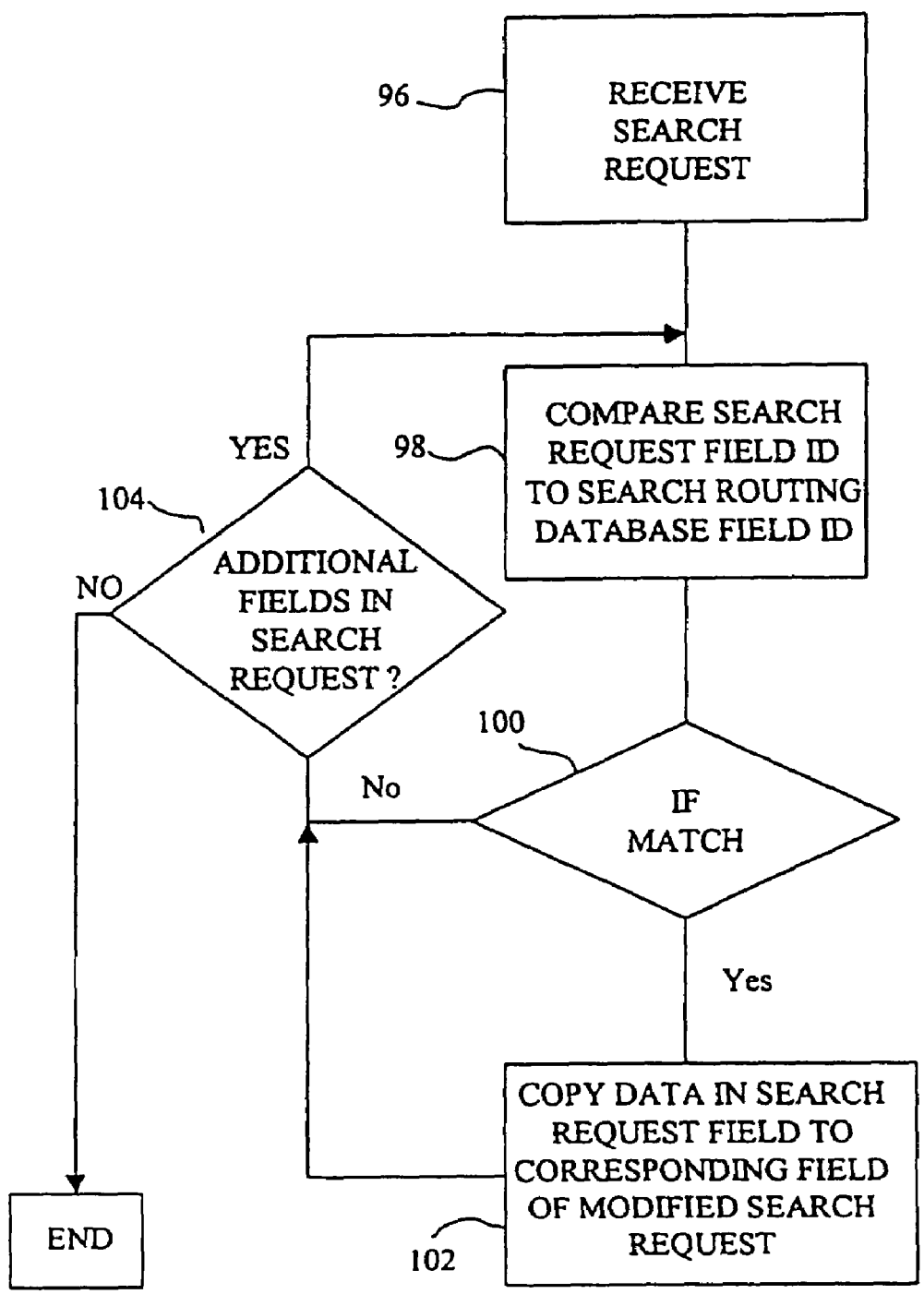
FIG. 7 is a flow chart setting forth an exemplary method of forming a modified search request for use in an embodiment of the present invention.

A preferred method of forming a modified search request 86 in accordance with the present invention is shown in FIG. 7. Once a search request 84 is obtained (step 96), the field identifier 85 of the first field of data in the search request 84 is compared with the field identifiers 60 used in the search-routing database 24 (step 98). If a match is found between the search request's field identifier 85 and a field identifier 60 used in the search routing database 24 (step 100), then the data, if any, contained in that field of the search request is copied into the corresponding field in the modified search request (step 102). If no match is found, then that data is not copied into the modified search request. Next, the original search request 84 is checked to see if it contains additional fields (step 104). If it does contain additional fields, then steps 98 through 104 are performed once again on successive fields of data. This process is repeated until no additional fields of data are contained in the input search request 84, at which point the modified search request 86 is complete. In some embodiments, the proxy server 20 may, at that point, add certain additional routing criteria to the modified search request. For example, the city and state fields in modified search request 94, shown in FIG. 6B, could be filled in by the process described above. The date field, however, could be filled in with data automatically generated by the proxy server.

One of ordinary skill in the art will appreciate that there are numerous other methods of forming a modified search request 86 in addition to the exemplary embodiment presented above. For example, in an alternative embodiment, the field-identifiers 85 of the original search request 84 and the search-routing database may be known in advance, thus enabling the proxy server 20 to automatically copy the data in the appropriate fields of the original search request 84 into corresponding fields in the modified search request 86 without the necessity of proceeding sequentially through each of the fields contained in each search request and comparing the field identifiers to the field identifiers contained in the search-routing database. Similarly, in another embodiment the original search request may not contain explicit field identifiers, and the correspondence between the entered data and the fields in the search routing database would then be deduced from, for example, the position of the input data in the stream of data comprising the search request, or from properties of the data itself. In yet another embodiment, the step of forming a modified search request is eliminated, and the original search request is used in place of the modified search request in the subsequent steps.

Returning to FIG. 5, once the modified search request 86 is formed (step 72), the proxy server 20 searches the search-routing database 24 for data responsive to the modified search request 86 (step 74). This search is preferably performed by search engine 48 stored within the proxy server 20 or within the search routing database 24. If responsive data is found in the search-routing database 24 (step 76), that is, if the data contained in the populated fields of the modified search request 86 are found in one or more records 26 in the search-routing database 24, then the database identifiers 64 from the responsive records 26 are returned to the proxy server 20 (step 78). For example, record 25 in FIG. 4 would be responsive to modified search request 86, shown in FIG. 6A, and thus the OR/WA database identifier contained in record 25 would be returned to the proxy server 20 when steps 74 through 78 were performed. As another example, records 25 and 27 in FIG. 4 would be responsive to the modified query 92 shown in FIG. 6B, and thus the ME/VT and OR/WA database identifiers would be returned to the proxy server 20.

In one embodiment of the present invention, search engine 48 has a spell-checking feature which allows the search engine to correlate data in the fields of the modified search request 86 to data in the fields of one or more records 26 in the search-routing database, even if the data is misspelled or mis-entered. For example, if the number for John A. Doe in Philadelphia was being sought, but in the search request the city had mistakenly been entered as "Filladellfia," the spell-checking feature would determine that the desired city was in fact Philadelphia, and return the appropriate database identifier 64 from a responsive record 26 in the search routing database 24. Similarly, if the data for the search request had been correctly inputted, but Philadelphia had been spelled incorrectly in the search routing database record 26, the spell-checking feature of the search engine would still find a match between the search request and the record, and return the appropriate database identifier 64.

If no responsive data is located in the search-routing database 24, in one embodiment a message would be sent to the user who submitted the search, indicating that there is no data responsive to the user's search request 84. In another embodiment, if no responsive data is located in the search-routing database 24, a predetermined group of one or more database identifiers would be returned to the proxy server 20 (step 80). Such a predetermined group of database identifiers would preferably be chosen to comprise the databases 28, 30, 32 most likely to contain data responsive to the original search request 84. For example, this group may comprise the databases closest in proximity to the user who submitted the original search request 84, the databases most recently updated, every database in the network, or any other suitable group of databases. Such an approach is advantageous in the situation where the modified search request has no fields which contain data, as may occur if the user enters data in only those fields of the search request that are not used to form the modified search request. Thus, even though there may be no intersection between the populated fields in the search request and the fields in the search-routing database, data responsive to the user's request can still be located using this default search strategy. Such a default strategy has the added advantage of enabling a search request to be obtained without requiring the user to populate certain input fields with data, thus making it easier for the user to operate the system, and further ensuring that the internal architecture of the system remains transparent to the user.

Referring once again to FIG. 5, the databases identified in step 78 or step 80 are now searched for data responsive to the original search request (step 82). For this purpose, the proxy server 20 could contain a list of contact information 51 enabling it to connect to each of databases 28, 30, 32. If multiple database identifiers are returned by step 78 or step 80, these databases can be searched in any suitable order without departing from the principles of this invention. For example, the databases could be searched serially, in parallel, or in some combination thereof. Moreover, although any suitable search engine may be used to search the databases identified in step 78 and step 80, in one embodiment the search engine used to search these databases would be of the same type as the search engine 48 used to search the search-routing database 24. As with search engine 48, the search engine used to search databases 28, 30, 32 may utilize spell-checking functionality to correlate misspelled or mis-entered data. Searching the databases identified in step 78 or step 80 with the same type of search engine used to search the search routing database is convenient and ensures that the results of the user's search will be the same as they would be if the search-routing database were not used, thus ensuring that the internal structure of the network of databases remains transparent to the user.

Once the appropriate databases have been searched for information responsive to the original query, the results of the search are returned to the user (step 83). As an example, with reference to FIGS. 4 and 6A, if database 30 shown in FIG. 4 were searched for data responsive to search request 84 shown in FIG. 6A (after being identified as the relevant database by the database identifier in record 25 as detailed above), then database record 68 would be returned to the user who submitted the search request. There are numerous ways to return the results of a database search. For example, certain responsive records could be merged together or sorted according to a predefined ordering criteria, such as alphabetical order. A merging scheme that produces a unitary output from multiple, multi-database records furthers the transparency of the system to the user, and allows for encapsulation of data, providing broad flexibility in data management. Of course, it will be appreciated that any suitable way of returning the search results may be used in accordance with the principles of this invention.

A further example is provided to describe a database network and method of searching, accessing and updating data in the database network according to the present invention. FIG. 8 illustrates a database network according to the present invention. The network comprises a plurality of offices—a New York office 201, a Los Angeles office 202, a San Francisco office 203, and a Seattle office 204. The offices are connected over a WAN 238. Each office comprises at least one server and at least one database dedicated to the storage, search and retrieval of data records in that office. One or more update databases may also reside in an office to facilitate updating records contained in other databases.

A database name is assigned by a database administrator to each of the databases at the various offices. This database name serves as an alias for a host name (IP address) and a port. Database names are attributes of the database files and are established at the time the database is authored. Typically, a database name is an arbitrary name which is resolved in the proxy server's configuration file. When a server is initiated on a particular database, that server reads the database name out of the database and uses that name. As a result, a server, when queried by the system for what its name is, will supply the name read from the database. Because a proxy server may access multiple databases, the present invention assigns a database name to each proxy server as an attribute of the proxy server.

Upon initiation of a proxy server, the configuration file of a particular proxy server references a plurality of databases that are particular hosts and particular port numbers. The proxy server interrogates each of the referenced hosts and ports to determine the database's particular name. The proxy server associates the database's name with the appropriate host and port numbers. Thus, when the proxy server receives a request and searches the search routing database or uses a default route which requires that the search request be sent to a named database, the proxy server already knows what those names mean in terms of actual hosts and port numbers.

Figure 8A:
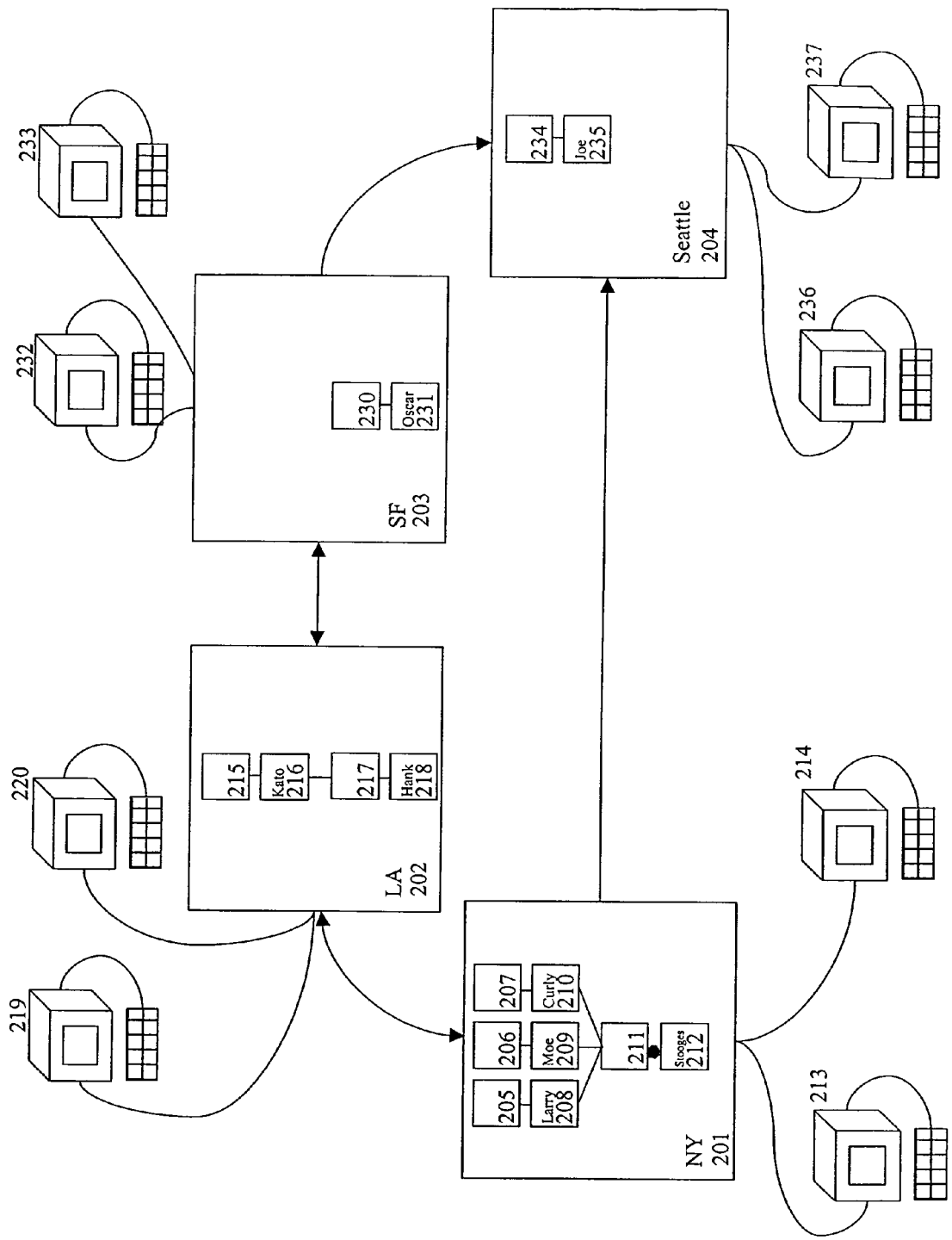
FIG. 8A illustrates a network of databases according to an embodiment of the invention.

In the example illustrated in FIG. 8A, the New York office 201 includes at least four databases: New York database 205 and server 208 "Larry" having informational records associated with New York; a New Jersey database 206 and database server 209 "Moe" having information records associated with New Jersey; and an update database 207 and database server "Curly" having records which have information to update particular records in the New York or New Jersey databases. Upon receipt of requests from a client, these database servers search the databases for selected records and pass them back over the network. A plurality of client terminals 213, 214 are provided through which requests are received and fulfilled.

In addition, in this example, the New York office is shown to also include a search routing database 211 and proxy server "Stooges" 212. As explained earlier in connection with FIG. 4, the search routing database is the means by which the system identifies those databases that are appropriate to search in response to a request. From an original request, a modified search request is generated. This modified search request is used to search a routing database. The results of this search of the search routing database are the names of the appropriate databases to search in response to the original request.

In the example shown in FIG. 8A, the Los Angeles office 202 has a CA database 215 database server "Kato" 216. Like the New York office, the Los Angeles office also has a search routing database 217 and proxy server "Hank" 218. The San Francisco office 203 in this example only has a search routing database 230 and a proxy server "Oscar" 231. The Seattle office has only a Washington database 234 and database server "Joe" 235. As with the New York office, each of the Los Angeles, San Francisco and Seattle offices have client terminals 219, 220, 232, 233, 236, 237 through which requests are received and fulfilled.

In a preferred embodiment, the present invention implements and takes advantage of the principle of encapsulated complexity. The principle of encapsulated complexity recognizes that local servers are most familiar with the structure and operation of the database network in their own locale, and, thus, are in the best position to efficiently decide how to distribute search requests to the local database network. Thus, the Stooges proxy server 212 in the New York office 201 decides how to distribute the search requests it receives to the New York City informational databases: Larry 208, Moe 209, and Curly 210. Remote sites beneficially rely on this local knowledge to distribute search requests more efficiently. Remote site, thus, when confronted with a search request that is determined to be best satisfied at another location need only decide which proxy server to route search requests to at the other sites. The remote sites leave the job of distributing the search requests to the appropriate individual databases at the other sites to the particular proxy servers situated at those sites. Thus, proxy servers communicate with proxy servers in other offices and database servers in their office.

As described, a proxy server serves as an intelligent router of database transactions between clients and database servers. It is understood that a proxy server is also capable of negotiating transactions between database servers or between proxy servers or between any combination of clients, proxy servers and database servers. In these cases, the proxy server retains the disclosed capabilities for merging and dynamically modifying the responses to create the appearance of a single, potentially updatable, database when desired. Any reference to a proxy server connecting to a server or database server is understood to mean either a database server, or a proxy server, or any external service capable of being responsive to database queries or other database transactions.

The proxy server is also capable of integrating the functionality of a database server or the proxy server can be implemented as an integrated enhancement of a database server. An integrated implementation of this kind is capable of both connecting to database or proxy servers for data and accessing or loading a physical database directly. This implementation is capable of simultaneously providing directly served data and data accessed via a connection to another server. It is capable, when appropriate, of simultaneously performing the same query against its own directly accessed database and against connections to other servers. This integrated implementation is also capable of merging and, as appropriate, dynamically modifying the results from both the directly accessed database and the externally connected servers. If and when a particular query or other database transaction is performed upon the directly accessed database is determined by the same routing criteria as queries that are routed to exterior servers. The integrated proxy/database server is capable of performing entirely externally routed transactions as well as transactions performed entirely upon the directly accessed database, or any combination thereof.

As an alternative embodiment to the encapsulated complexity approach described above, the present invention implements a universal search routing database which provides for system-wide routing. Using a universal search routing database approach, proxy servers route to the discrete database servers at remote sites rather than to other proxy servers. A universal search routing database may be centrally located at a corporate headquarters. Alternatively, multiple copies of a universal search routing database may be distributed system-wide.

An example of a set of search routing tables using encapsulated complexity is illustrated in FIG. 8A. As explained in connection with FIG. 4, applying the modified search to a search routing table, a route is identified for the original search request through the database network. Examples of search routing tables corresponding to the system illustrated in FIG. 8A are provided. Table 251 is an example of a search routing table for the New York office 201. Table 251 would be maintained on search routing database 211. Table 252 is an example of a search routing table for the Los Angeles office 202. Table 252 would be maintained on search routing database 217 in the Los Angeles office 202. Table 253 is an example of a search routing table for the San Francisco office 203 and would be maintained on search routing database 230 in the San Francisco office 203. The Seattle office 204, without a search routing database or proxy server, would not have a corresponding search routing table.

Suppose a search request is entered via client terminal one 232 in San Francisco for a New York telephone number for a café named "Joe's Café." Because a state is supplied with the request, a modified search request is generated by the system with the state field filled in with the data "NY." Proxy server "Oscar" 231 would receive the modified request and search search-routing database 230 for responsive routing directions. Entry 260 in search routing table 253 in search routing database 230 would return "Stooges" database as the appropriate database to search for data responsive to the modified request.

The system would then send over the WAN the original search request to the Stooges proxy server 212 in the New York office 201. The Stooges proxy server in the New York office does not know the difference between a search request generated at a remote site transmitted over the WAN versus the same original search request generated by a local user at client terminal one 213. Thus, the Stooges proxy server 212 will process the original search request received from the San Francisco office 203 just as if it had received the request via client terminal one 213.

The Stooges proxy server 212 searches its own search routing database 211 to determine which database to search. Again, a modified search request is generated and a search of the search routing tables in search routing database 211 is performed. The modified search request would look similar to the modified search request generated in the San Francisco office. There would be at least a state field populated with the data "NY." In the present example, the search of search routing table 251 in the New York office 201 with this modified search request would return entries 255 and 256 corresponding to databases servers "Larry" and "Curly", 208, 210 serving the New York and update databases 205, 207. A search can return more than one record. In the current implementation, a search is performed on all the database names that are returned from the search routing database search. Thus, the original search request would then be directed to the Larry and Curly database servers for fulfillment.

Certain offices may not include the capability to search remotely. Referring to the example shown in FIG. 8A, the Seattle office 204 does not include a proxy server or search routing database. Searches received at the Seattle office 204 may only be satisfied by conducting a search on the Washington database 239. The other three offices, New York, Los Angeles and San Francisco, also have the capability to search the Washington database 239.

In addition to the search routing tables in each of the search routing databases 211, 217 and 230, there is defined for each proxy server one or more default routes. Default routes specify how a search request is routed when a modified search request fails to return a route. This typically occurs when either (i) the search request does not include a field that is used for routing; (ii) the search request includes a specified routing field but no data is populating that field; or (iii) there is data in the routing field(s) that is not matched in the corresponding field(s) in the routing database. For example, suppose a search request is received into the system via the Los Angeles Office 202 (FIG. 8A). If this search request does not have a state field or has a state field but does not have a state specified, the search routing database would return a default route. Generally, the default route is defined to route the request to the data that is available to the servers that are on the local host, in this example, CA database "Kato" 216.

However, other default routes may also exist. For example, the San Francisco office 203 would specify a default route to the Los Angeles local host because the system has no local databases in the San Francisco office.

Figure 8B:
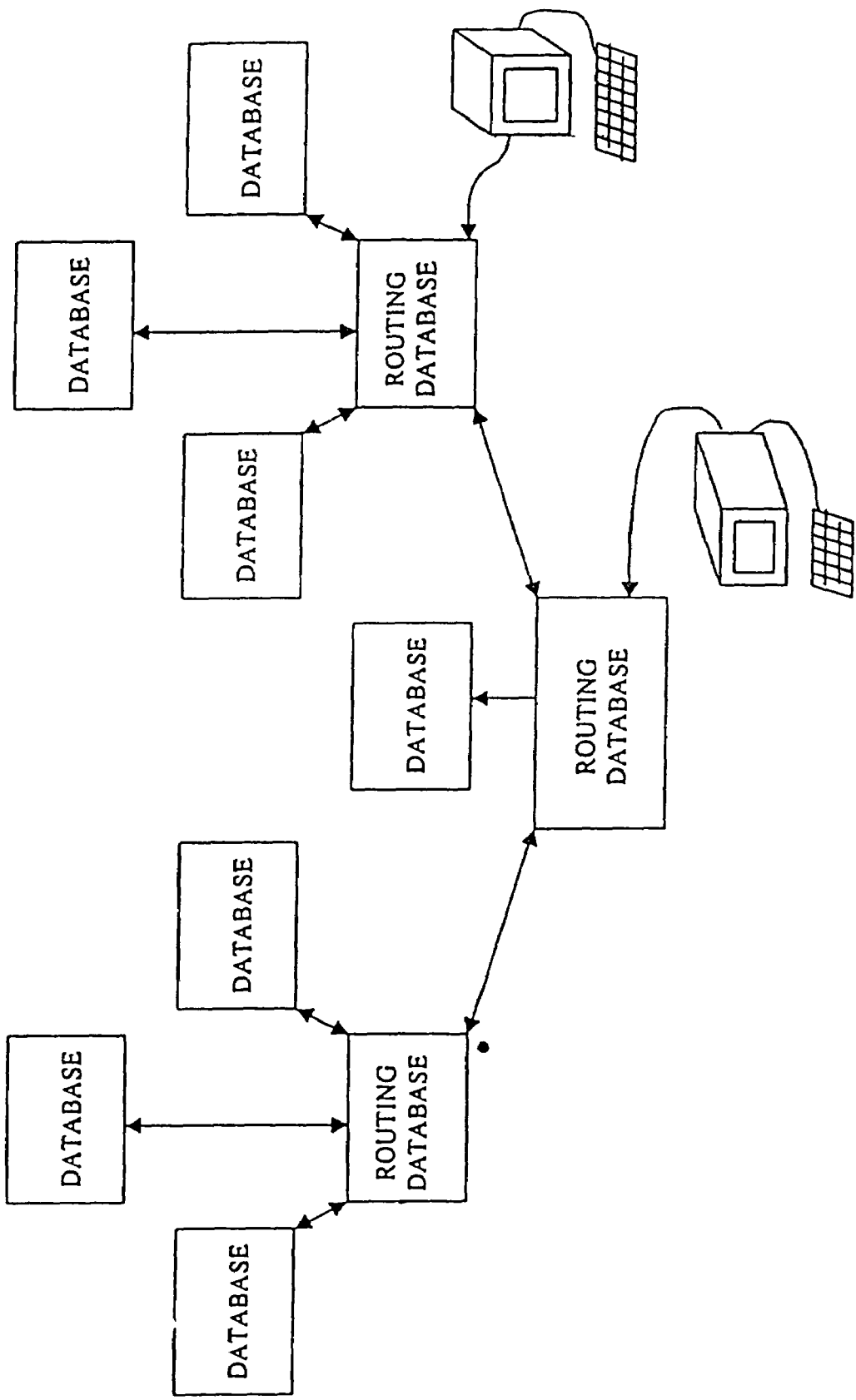
FIG. 8B illustrates a network of databases according to another embodiment of the invention.
Figure 8C:
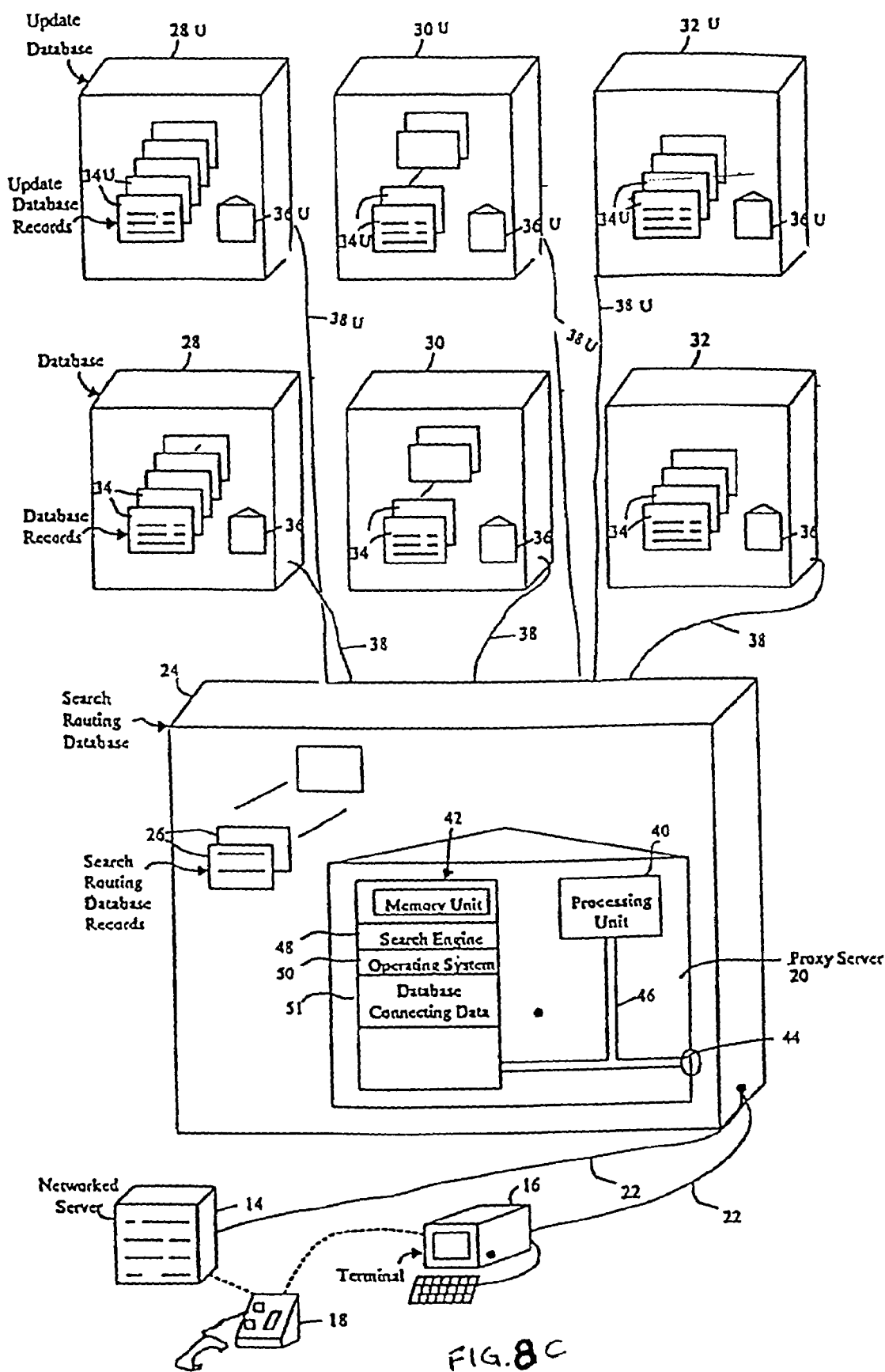
FIG. 8C illustrates a network of databases according to yet another embodiment of the invention.

FIGS. 8B and 8C illustrate further embodiments of database network architectures for performing the query searches, database access and record updates described herein. In FIG. 8C, an index "U" is used to distinguish an update database record from its pre-update counterpart.

Figure 10:
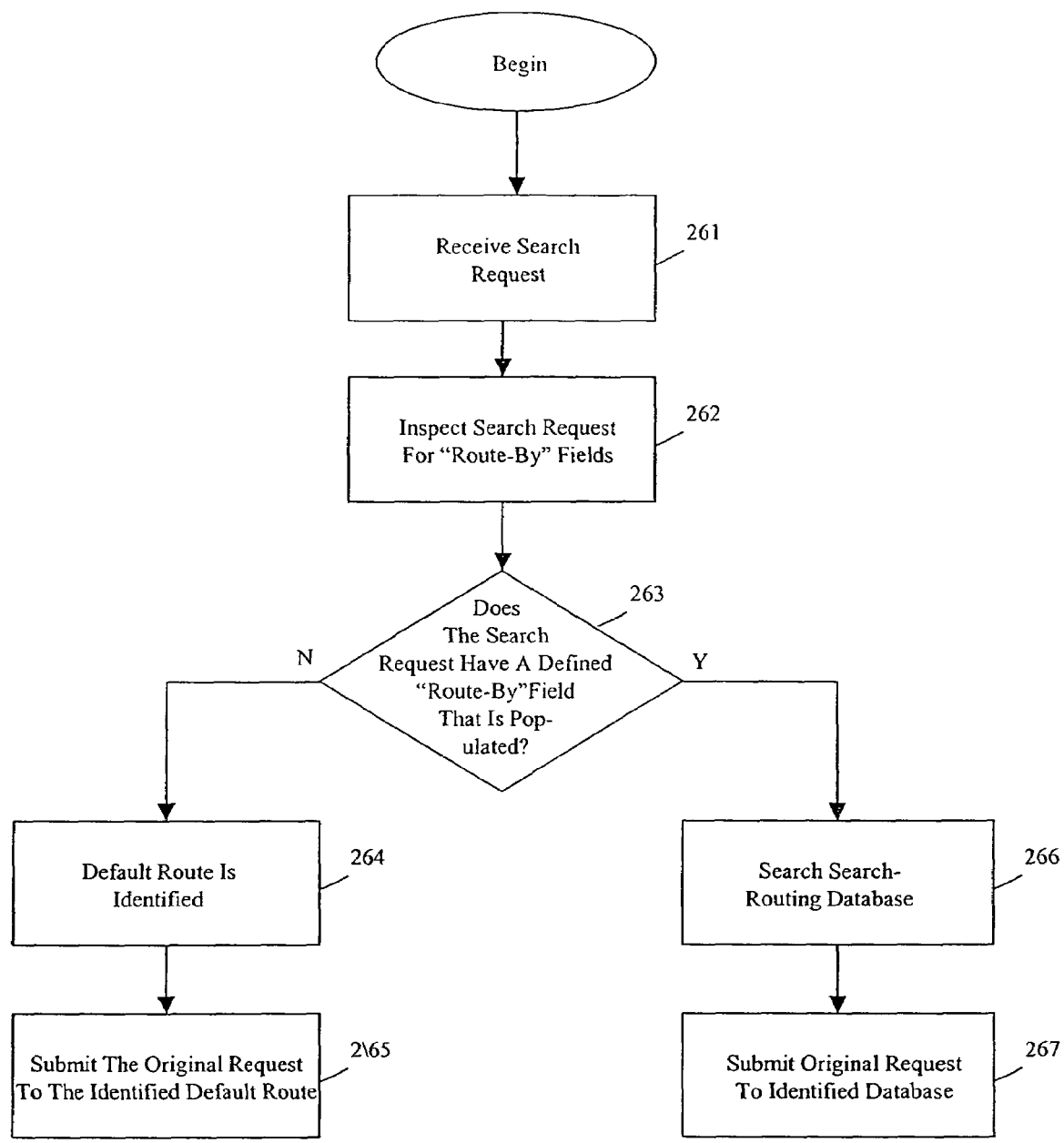
FIG. 10 is a flow chart illustrating request processing flow according to an illustrative embodiment.

A flow chart illustrating request processing flow is provided in FIG. 10. The flow chart illustrates how a request is accepted and sent to the appropriate database. At step 261, a search request is received from a client. The search request is inspected to determine whether it includes a defined "route-by" field(s) (step 262). Although the present invention has been described using the state as the "route-by" field, it is understood to one skilled in the art that any data element or combination of data elements may be used. If the search request does not have a defined "route-by" field or such a field is unpopulated (step 263), then a default route is identified (step 264) and the original request is submitted to the identified default route (step 265). If the search request has a populated route-by field (step 263), a search of the search routing database is performed using defined "route-by" fields with the content of the corresponding field(s) in the original request (step 266). Because this is often a subset of the entire original request, it is often referred to as a "modified search request." If the search of the search routing database returns one or more database identifiers, the original request is submitted to the identified databases for fulfillment (step 267).

The present invention processes search results as follows. Results are received in parallel at input buffers from the one or more child databases and/or proxy servers. The results from these databases/servers are assumed to be sorted by identical criteria (e.g., name and city). The issuing proxy server performs a merge function which produces a single output stream from the multiple input streams returned from the search. Thus, the present invention presents to a user the appearance of a search performed on a single, sorted source.

The merge function is similar to a sorting algorithm. The current record waiting at each input buffer is examined. The contents of the defined sorting fields from each record are compared. The record with the lower or earlier values in collation sequence is written to an output. Collation sequence is typically understood to mean alphabetic or numeric order. Typically, library functions for performing comparisons rely upon the collation sequence as defined by the local operating system. Arbitrary collation sequences can be substituted for the system default if desired. Such substitution requires the creation of customer comparison functions.

The next record from the output is read and the cycle repeats until there are no records remaining on any of the input streams.

Duplicates are removed from the search results with a extension of the merge algorithm. Duplicates are removed by the enforcement of uniqueness based upon a comparison of the content of the defined sorting fields. Comparison of record contents within defined fields are performed in accordance with defined matching rules. The preferred embodiment has a matching rule of exact match, including trailing spaces. It is understood by those skilled in the art that the present invention is not limited to this matching rule but instead covers any arbitrary matching rule an administrator or programmer may choose to define.

According to the present invention, to accomplish duplicate removal, processing occurs as described above except that the most recently output record is also kept in a separate output buffer. As new records are read in from the inputs, they are compared to the contents of the output buffer. If the input record matches the content of the output buffer, within the defined matching fields and by the defined matching rules, then that input record is discarded and the next is read. If there are no records in the input(s) matching the record in the output buffer, the record in the buffer is written to the output and the next record in collation sequence from input(s) is written to the output buffer. The process repeats until there are no records remaining on any of the input streams.

Using the merge and duplication removal processing described above in combination with unique internal architecture of the database network, the present invention is able to achieve an effective method and system to update databases.

As illustrated in FIG. 8A, an update database is created that corresponds to one or more main databases that the system wants to update (for example, the Curly database has records that are adds and deletes corresponding to records in the Larry and Moe main databases). The system administrators set up the search routing tables such that the update databases are placed on the same routes as the main databases to which they correspond. When a main database is a default route, the update database corresponding to that main database is made part of that default route. Similarly, when a main database is part of a specific route identified in a search routing table, the corresponding update database occurs on the same route. Referring to FIG. 9B, it is noted that any search to database 28, 30, 32 is also routed to update database 28$u$, 30$u$ and 32$u$. Turning to the databases shown in FIG. 8A, any search to the New York database is routed to both the main New York database Larry and the update database Curly. Similarly, any search to the New Jersey database is routed to both the main New Jersey database Moe and update database Curly. As a result, a search of the New York database will return both results from the New York database as well as update database.

Figure 11A:
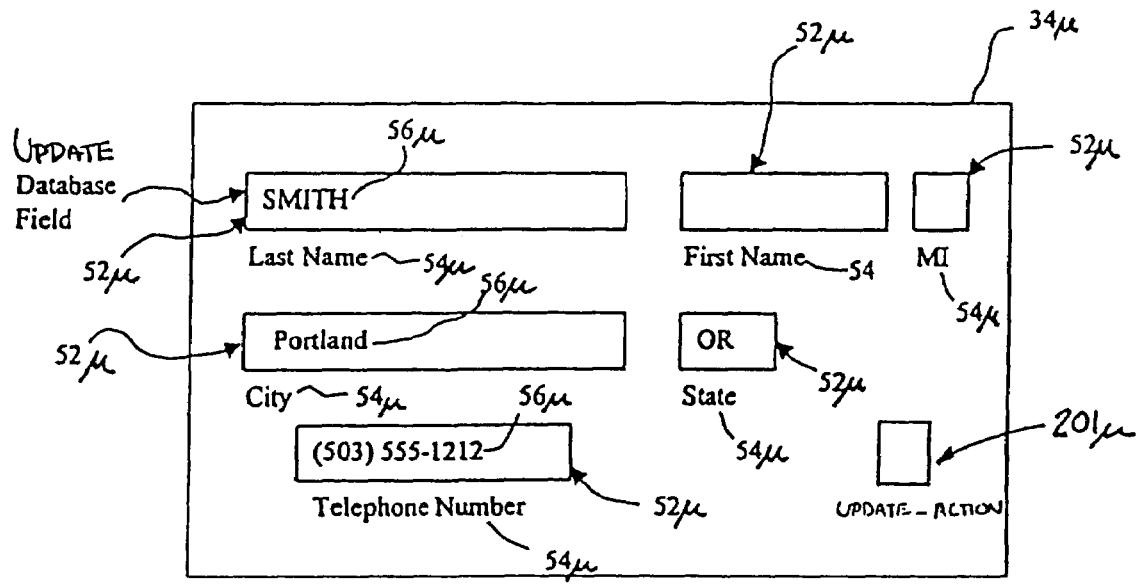
FIG. 11A is an illustration of an update database record in an update database for a database.
Figure 11B:
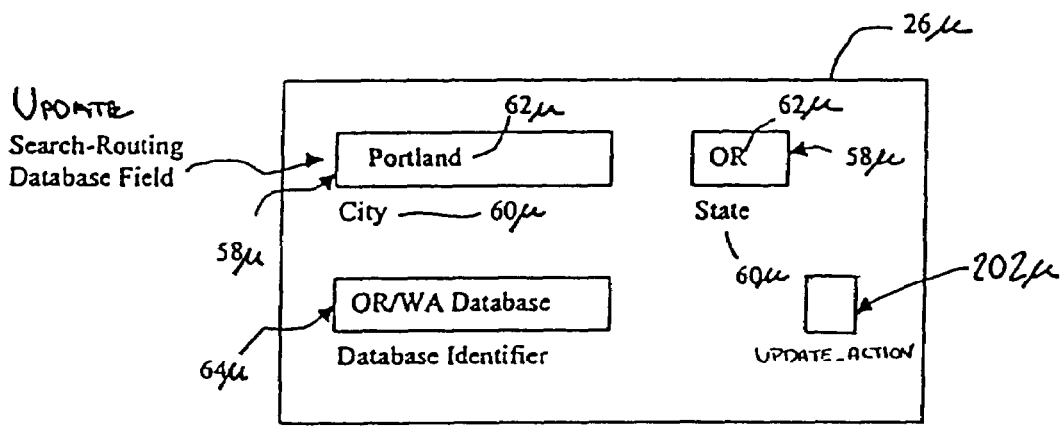
FIG. 11B is an illustration of an update search-routing database record according to an embodiment of the invention.

Updating of records from the search results from the New York and update databases is a further extension to the merge algorithm with duplicate removal. Update is a method defined by which a record can be identified for removal or addition. According to the preferred embodiment, this method can be a defined value in a defined field. FIG. 11A shows an exemplary update database record 34$u$ having a plurality of fields 52$u$, each field 52$u$ having an associated field identifier 54$u$ and potentially containing data 56$u$. Similar to the record illustrated in FIG. 2, the update record has six fields 52$u$ for storing data 56$u$ regarding an individual's last name, first name, middle initial; city, state, and telephone number. Update record 26$u$, 34$u$ contains an additional field that is used by the present invention to perform on-the-fly updating. As depicted in FIG. 10, this additional field is identified as UPDATE_ACTION 201$u$. The UPDATE_ACTION field 201$u$ is populated with a predefined value. According to the preferred embodiment, when the UPDATE_ACTION field contains a "D" then records are to be deleted. Any other value in the UPDATE_ACTION field constitutes an insertion. It is readily apparent to one of ordinary skill in the art that any appropriate data structure for the UPDATE_ACTION field and any particular choice of values in the UPDATE_ACTION field could be used in accordance with the principles of this invention.

Figure 12:
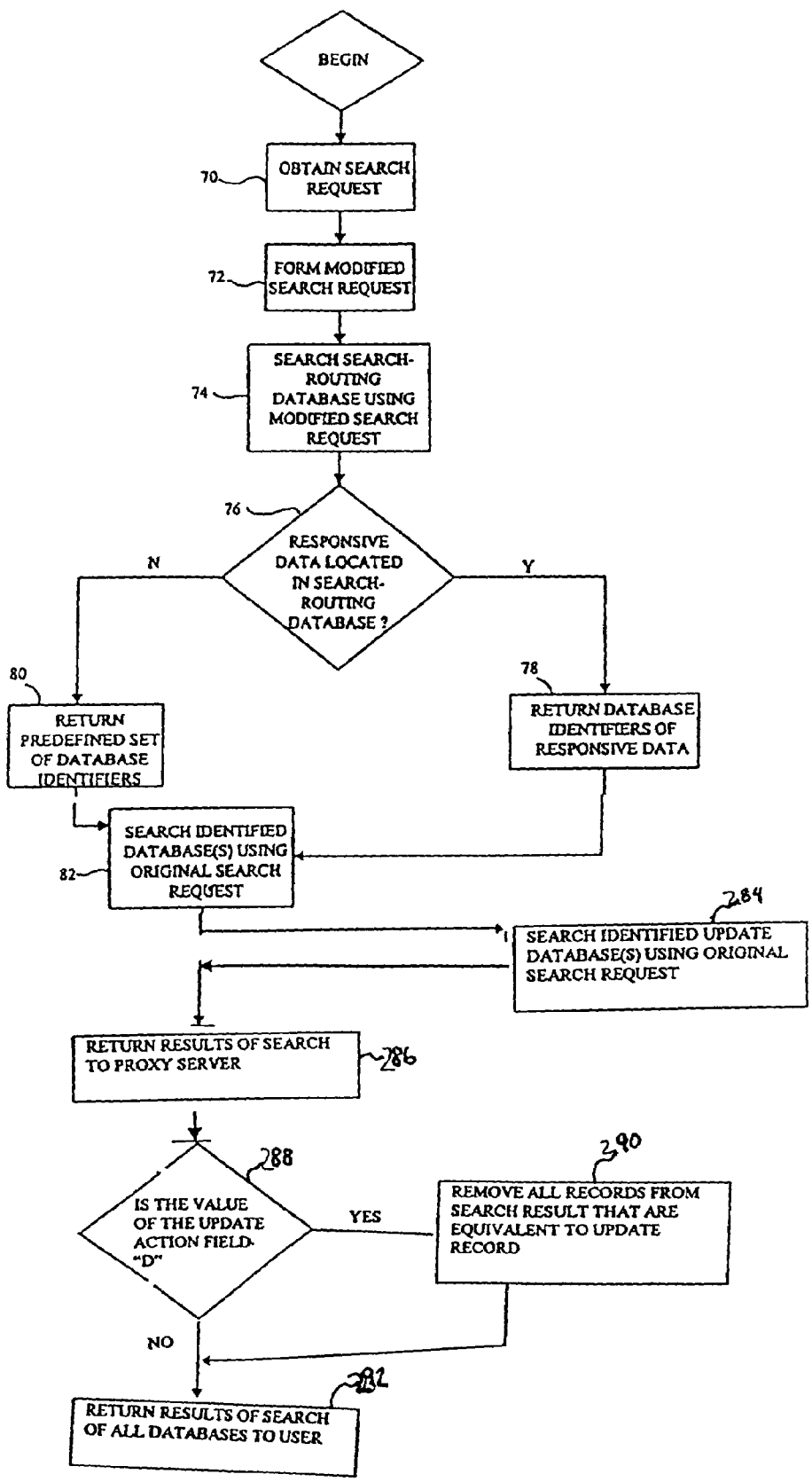
FIG. 12 is a flow chart illustrating a record update process according to an embodiment of the invention.

The present invention accomplishes the appearance of record deletion by implementing an algorithm using a comparison of a database record with an update database record. This technique is shown with reference to FIG. 12. As shown by FIG. 12, in one embodiment, a query search is performed in the same or similar manner as shown in FIG. 5 (steps 70–82). After the identified databases are searched using the original search requests (step 82), the identified update database(s) are searched using the original search request (step. 284). The search results are then returned to the proxy server (step 286). The proxy server assures that in any case where there are one or more database records which are logically duplicate to a update database record (according to the defined matching rules) AND the update database record also includes the defined delete indicator (UPDATE_ACTION=D) (step 288), then NONE of these records are written to the output (step 290).

One such record deletion algorithm comprises writing any record selected for output to an output buffer, but not actually sent to the output. An output mode flag is maintained, capable of indicating that records matching the record in the output buffer are not to be output. Subsequent records read from each input are compared to the record in the output buffer as in the case above with duplicate removal. If any record from any input buffer matches the record in the output buffer (according to defined matching criteria) AND that record includes the defined delete indicator, THEN the output mode flag is set to indicate delete mode AND the record read from the input is discarded.

If any record from any input buffer matches the record in the output buffer (according to defined matching criteria) AND that record does NOT include the defined "delete" indicator, then that input record is discarded, and the output mode flag remains unchanged.

Where there are no more records present in the input buffers that match the record in the output buffer, the output mode flag is checked. If it indicates "delete," then the record in the output buffer is discarded and no record is written to the output. If the flag does not indicate "delete", then the record in the output buffer is written to the output (step 292) and the buffer and flag are cleared.

The present invention encompasses a number of additional embodiments and capabilities. One further embodiment of the present invention provides for direct database access on a local host without database servers. More particularly, this embodiment has the proxy server controlling the local databases directly, thus fulfilling the role of database server as well as proxy server. This embodiment takes advantage of the fact that the proxy server generally provides a fully inclusive superset of the functionality of the database server. This particular embodiment is not illustrated in FIG. 8A but would have the Stooges database interfacing directly with the New York, New Jersey and update database, thereby eliminating the Larry, Moe and Curly database servers.

An additional capability of the present invention is that the update data and corresponding base data may reside in different offices on different hosts. Thus, from a data management standpoint, the database administrator has the ability to keep the update data and the main data to which it applies on different hosts. For example, an administrator in the San Francisco office 203 may be able to access the California database information that is resident on the Los Angeles host 202. However, the San Francisco administrator may want to customize that information for San Francisco purposes such as taking out or modifying a few records. Thus, the San Francisco search routing database would be set up such that when a record requires a search to be performed in California, the search routing database would return Hank, the name of the proxy server 218 in the Los Angeles office, as well as the name of a San Francisco database server controlling a local San Francisco update database (not shown).

The present invention is not limited to networked clients on LANS and WANs. To the contrary, the present invention is capable of handling requests from direct wire clients providing the appropriate protocol to query the proxy. Similarly, the present invention could respond to a request issued via a web gateway. For example, a user could issue a search request through a website. A proxy server such as Stooges, Hank or Oscar would be attached as the backend of the website. The website request would be handled according to the principles of this invention. In addition, the present invention, while an effective tool for managing geographically distributed data, is also capable of managing large database or performing updates on a completely closed system situated in a single site. Often, a single database gets so large that it is impractical to manage the databases for various reasons. The present invention allows for a plurality of smaller, more manageable, more updateable databases to appear to the end user as a single large database.

By narrowing the number of databases that are searched to include only those that are most likely to contain responsive data, the present invention is capable of significantly increasing search efficiency. Moreover, as described above, the internal structure of the network remains transparent to the user, who can simply view the entire network as a single database, thus making the system easy to use. In addition, accurate results are ensured since the data contained in the search-routing database is the same, or substantially the same, as the data contained in the network of databases, rather than an abstracted or summarized version of these data. Furthermore, the search-routing database is able to achieve these efficiencies while imposing relatively small data storage requirements of its own, since only a small portion of the total amount of data in the network needs to be contained in the search-routing database.

The optimum choice of fields for the search routing database will largely depend upon the application and the universe of data fields at hand. For example, in FIG. 4, the data in the network is segregated according to the "state" field, a separate database existing for each state or group of states. Accordingly, for this application it may be desirable to include the "state" field in the search-routing database, so that search requests are directed to the minimum possible number of databases, while still resulting in a comprehensive search. Thus, for example, if a user submits a search request seeking information on persons with the last name of Smith in the state of Oregon, the search request would only be routed to the OR/WA database. In contrast, if the search-routing database were to contain only the "last name" field, the query would be routed to all of the database that contain the last name of "Smith", which would most likely comprise a substantial percentage of the total number of databases in the network.

As another example, suppose the data in the network of databases were segregated alphabetically by last name. Thus, for example, one database may contain all last names beginning with letters A–C, another database may contain all last names starting with D–F, and so forth. In this system, it might be beneficial to include the last name field in the search routing database, thus ensuring that input search requests will be routed to a minimal number of databases in the network, and that a comprehensive search will be achieved. Thus, it can be seen that the searching efficiency realized by the system can be increased by including fields in the search-routing database that correspond to the data separation scheme used to store data in the network. Similarly, the data separation scheme for databases on the network can be designed in light of, or in combination with, the fields of the search-routing database 24 to achieve the highest ratios of efficiency and comprehensiveness.

The greatest efficiencies are achieved when the search routing database 24 utilizes fields encompassing geographical boundaries or logical divisions such as state or area code. Utilizing such large scale divisions will not only result in a small, rapidly-searchable search routing database, it will also most likely reflect the actual data separation scheme used across the network. For example, a national directory assistance service center with local call centers in different geographic regions might maintain individual databases physically located at each local call center, each database containing the phone numbers of the respective local area codes. If a customer call to the directory assistance center was being handled out of a particular local call center, but the caller desired a number in another region, ordinarily the directory assistance center's entire network of databases would have to be searched. However, by utilizing a "state" or "area code" field in the search routing database 24, the search would be directed to the appropriate local call center's database only, resulting in an efficient and rapid query return.

Although certain categories of fields for the search routing database have been described, one of ordinary skill in the art will realize that any suitable set of fields may be included in the search routing database in accordance with the present invention. It should also be appreciated that the fields in the search-routing database 24 need not comprise a strict subset of the fields in the input query or in each of the databases in the network of databases. For example, the search-routing database may contain fields that do not appear in some input queries, or in some of the databases in the network of databases.

In a nationwide information system having numerous large individual databases dispersed countrywide, more than one database may include an entry that requires updating. By way of example, it would be expected that there would be a record of the toll-free telephone number of a nationwide rent-a-car company (similar to record 34) in plurality of the individual databases comprising a nationwide directory assistance information system. Suppose the nationwide rent-a-car company changed its toll-free telephone number. This change would necessitate updating all of the plurality of individual databases having a record of the former toll-free telephone number of the company. An update record would be created in each of the update databases associated with each of the databases having a record of the former toll-free telephone number. In an alternative embodiment of the invention, a shared update database is associated with each of the databases in the information system (and, thus, with each of the databases having a record of the former toll-free telephone number). Because the shared update database is associated with each of the databases in the information system, only one update record is required to update the entire system. It is understood that a shared updated database may be shared by fewer than all of the database in the information system.

There are instances in which it may be beneficial to have more than one update database associated with a particular database structure. Suppose a database which is constructed with information from two sources, such as a database of directory listings for all wireless telephone numbers. In the San Francisco bay area, there are at least two different wireless providers. One method of creating the database of directory listings for all wireless telephone numbers is have each of the different wireless providers supply the directory listing information for its own customers. The database would be a compilation of all such information from each of the wireless providers. Because each of the wireless providers should be permitted to access and update only those records it supplies, each should have its own update database associated with the database of directory listings. Thus, there would be two update databases associated with the database of wireless telephone directory listings. It is understood that instances in which there are more than two update databases associated with a particular database is within the purview of the present invention.

Accordingly, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for providing a search output responsive to a query, comprising:
    maintaining a search-routing database;
    receiving a query from a user, said query comprising search request data in a plurality of search request fields of predetermined types;
    selecting the search request data in at least one of the search request fields;
    searching said search-routing database for one or more database identifiers, based on the selected search request data, each of said one or more database identifiers identifying one or more first databases;
    routing the query to a selected one of the one or more first databases identified by said one or more database identifiers and to one or more second databases associated with the one or more first databases;
    searching a selected one of the one or more second databases for database records responsive to the query;
    searching a selected one of the one or more second databases for an update record responsive to the query;
    determining whether a delete indicator is made in the update record; and
    including in a search output the records responsive to the query except at least one or more of the database records which correspond to the update record when the delete indicator is made in the update record.

2. The method of claim 1, wherein the delete indicator comprises at least one field of the update record.

3. A system for providing a search output responsive to a query, comprising:
    a search-routing database;
    one or more first databases, said first databases including database records having database fields;
    one or more second databases associated with the first databases, said second databases including update records having update database fields;
    an input device for receiving the query from a user, the query comprised of search request data in search request fields of predetermined types;
    a search router for receiving the query and selecting search request data in at least one of the search request fields, the search router comprising a first search engine configured for searching said search-routing database for one or more database identifiers, each of said one or more database identifiers identifying one or more of the first databases;
    a second search engine for searching a selected one of the first databases for database records responsive to the query, returning the database records responsive to the query, searching a selected one of the second databases for an update record responsive to the query, returning the update record responsive to the query, and determining whether a delete indicator is made in an update database field of the update record; and
    a sorter for generating the responsive records resulting from the search of the selected first and second databases, and including in the search output the records responsive to the query except at least one or more of the database records which correspond to the update record when the delete indicator is made in the update database field of the update record.

4. The system of claim 3, further comprising a table for identifying the one or more second databases associated with the one or more first databases.

5. A method of routing search requests, comprising:
    receiving a search request at a receiving server, the receiving server having one or more first databases accessible for searching, the search request comprising search request data in a plurality of search request fields of predetermined types;
    selecting search request data in at least one of the search request fields;
    searching a routing database for one or more database identifiers identifying one or more of the first databases, based on the selected search request data, to determine whether the search request should be routed to the one or more first databases accessible by the receiving server; and
    if it is determined that the search request should be routed to a selected one of the one or more first databases accessible to the receiving server:
        routing the search request to a selected one of the one or more first databases accessible by the receiving server and a selected one of one or more second databases associated with the one or more first databases;
        searching the selected one of one or more first databases accessible to the receiving server;
        searching the selected one of the one or more second databases for an update record responsive to the query;
        determining whether a delete indicator is made in the update record; and
        including in a search output the records responsive to the query except at least one or more of the database records which correspond to the update record when the delete indicator is made in the update record.

6. The method of claim 5, wherein the determining includes analyzing the search request to identify one or more items of routing data.

7. The method of claim 5 further comprising routing the search request to a second server if it is determined that the search request should not be routed to the one or more first databases accessible by the receiving server.

8. The method of claim 7, wherein said second server is remotely located from the receiving server.

9. The method of claim 7, further comprising routing the search request to the one or more databases accessible by said second server.

10. The method of claim 9, further comprising returning to the receiving server the results of the search obtained in response to the routing of the search request to the one or more databases accessible by said second server.

11. The method of claim 5, wherein the one or more second databases comprise a plurality of records for updating the one or more first databases.

12. The method of claim 11, further comprising merging the search results returned from the first databases with the search results returned from the one or more second databases.

13. A system for routing search requests comprising:
an input device configured to receive a search request, the search request comprising search request data in a plurality of search request fields of predetermined types;
a receiving server having one or more first databases accessible for searching, configured to search a routing database for one or more database identifiers identifying one or more of the first databases based on search request data selected from at least one of the search request fields to determine whether the search request should be routed to the one or more first databases accessible by the receiving server, and to route the search request to the one or more first databases accessible by the receiving server and to one or more second databases associated with the one or more first databases, if it is determined that the search request should be routed to the one or more first databases accessible by the receiving server;
a processor configured to search a selected one of the first databases for database records responsive to the query, returning the database records responsive to the query, search a selected one of the second databases for an update record responsive to the query, return the update record responsive to the query, and determine whether a delete indicator is made in an update database field of the update record; and
a sorter configured to generate the responsive records resulting from the search of the selected first and second databases, and include in the search output the records responsive to the query except at least one or more of the database records which correspond to the update record when the delete indicator is made in the update database field of the update record.

14. The system of claim 13, wherein the receiving server determines said search request routing by analyzing the search request to identify one or more items of routing data.

15. The system of claim 14, wherein the receiving server routes the search request to a second server if it is determined that the search request should not be routed to the first databases accessible by the receiving server.

16. The system of claim 15, wherein the second server is remotely located from the receiving server.

17. The system of claim 15, wherein the second server routes the search request to the one or more databases accessible by the second server.

18. The system of claim 17, wherein the second server returns the results of the search obtained in response to the routing of the search request to the one or more databases accessible by the second server.

19. The system of claim 13, the one or more second databases comprise a plurality of records for updating the one or more first databases.

20. The system of claim 19, wherein the receiving server merges the search results returned from the one or more first databases with the search results returned from the second databases.

21. A method of routing search requests comprising:
maintaining a routing database for identifying one or more first databases to search in response to a search request;
receiving the search request, the search request comprising search request data in a plurality of search request fields of predetermined types;
selecting search request data in at least one of the search request fields;
searching the routing database for one or more database identifiers identifying one or more of the first databases, based on the selected search request data, and to determine at least one route to one or more first databases to search in response to the search request;
if the search of the routing database is successful:
routing the search request to a selected one of the one or more first databases associated with the one or more database identifiers and to one or more second databases associated with the one or more first databases;
searching a selected one of the one or more first databases for database records responsive to the query,
returning the database records responsive to the query;
searching a selected one of the one or more second databases for an update record responsive to the query;
returning the update record responsive to the query;
determining whether a delete indicator is made in an update database field of the update record;
generating the responsive records resulting from the search of the selected first and second databases; and
including in the search output the records responsive to the query except at least one or more of the database records which correspond to the update record when the delete indicator is made in the update database field of the update record; and
in other instances, routing the search request to a second database identified by one or more default routes.

22. The method of claim 21, further comprising analyzing the search request to identify one or more items of routing data.

23. The method of claim 22, further comprising searching a routing database with the identified one or more items of routing data to identify at least one of the first databases to which the search request should be routed.

24. The method of claim 21, wherein the routing databases identifies at least one route to at least one of the first databases that are appropriate to search in response to the search request.

25. The method of claim 21, wherein the search request is routed to at least one of the first databases identified by the one or more default routes if the search request does not include a field that is used for routing.

26. The method of claim 21, wherein the search request is routed to at least one of the first databases identified by the one or more default routes if the search request includes a field that is used for routing but the field has an unspecified value.

27. The method of claim 21, wherein the search request is routed to at least one of the first databases identified by the one or more default routes if the search request includes a field that is used for routing but the data populating the field does not correspond to any entries in the routing databases.

* * * * *